United States Patent
Mauri et al.

(10) Patent No.: US 11,837,386 B2
(45) Date of Patent: Dec. 5, 2023

(54) REINFORCED WATER BARRIER OVER A JOINT

(71) Applicant: NEXANS, Courbevoie (FR)

(72) Inventors: Massimiliano Mauri, Borgenhaugen (NO); Simon Jorgensen, Sellebakk (NO); Pal Braekke Gronberg, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/521,468

(22) Filed: Nov. 8, 2021

(65) Prior Publication Data

US 2023/0139062 A1 May 4, 2023

(51) Int. Cl.
*H01B 7/282* (2006.01)
*H02G 15/184* (2006.01)

(52) U.S. Cl.
CPC ........... *H01B 7/282* (2013.01); *H02G 15/184* (2013.01)

(58) Field of Classification Search
CPC ...... H02G 1/14; H02G 15/064; H02G 15/068; H02G 15/08; H02G 15/10; H02G 15/88; H02G 15/188; H02G 15/1833; H02G 15/013; H02G 15/184; H01R 4/72; H01R 43/00; H01R 4/00
USPC ........... 174/73.1, 74 R, 74 C, 78, 84 R, 88 C
See application file for complete search history.

(56) References Cited

U.S. PATENT DOCUMENTS

| | | | |
|---|---|---|---|
| 4,383,131 A * | 5/1983 | Clabburn | H02G 15/10 174/DIG. 8 |
| 4,516,830 A | 5/1985 | Guazzo | |
| 4,518,819 A | 5/1985 | Larsson | |
| 4,595,256 A | 6/1986 | Guazzo | |
| 4,725,693 A * | 2/1988 | Hirsch | B32B 7/14 174/106 SC |
| 5,422,438 A * | 6/1995 | Lamome | H01R 4/70 174/76 |
| 5,801,332 A * | 9/1998 | Berger | H02G 15/184 174/73.1 |
| 9,425,605 B2* | 8/2016 | Yaworski | H02G 1/14 |
| 10,381,818 B2* | 8/2019 | Nakamura | H02G 15/188 |
| 2009/0218135 A1* | 9/2009 | Vallauri | H02G 15/184 174/88 C |

(Continued)

FOREIGN PATENT DOCUMENTS

| | | | | |
|---|---|---|---|---|
| DE | 3346170 | * | 7/1985 | ............ H02G 15/18 |
| SE | 2 050 214 | | 2/2020 | |

OTHER PUBLICATIONS

European Search Report dated Apr. 22, 2021.
Submarine Power Cables; T.Worzyk; dated Nov. 10, 2022.
Third party observation dated Nov. 8, 2022.

*Primary Examiner* — William H. Mayo, III
(74) *Attorney, Agent, or Firm* — Sofer & Haroun, LLP

(57) ABSTRACT

A reinforced water barrier over a joint between power cables is suited for subsea cables having different water barrier/sheathing designs. The reinforced water barrier has an intermediate water barrier made of lead or a lead alloy which stretches over the joint and is attached to the underlaying water barriers of the joined cables, and which is reinforced by being coated with a layer of polyethylene based adhesive followed by a layer of polymeric outer sheathing. The adhesive layer and the layer of polymeric outer sheathing are thermally set by a heat treatment.

14 Claims, 7 Drawing Sheets

(56) References Cited

U.S. PATENT DOCUMENTS

2010/0193235 A1\* 8/2010 Taylor ................ H02G 15/1833
29/869

\* cited by examiner

US 11,837,386 B2

REINFORCED WATER BARRIER OVER A JOINT

RELATED APPLICATION

This application claims the benefit of priority from EP 20 306 368.0, filed on Nov. 12, 2020, the entirety of which is incorporated by reference.

FIELD OF THE INVENTION

The present invention relates to a reinforced water barrier over a joint between power cables, the reinforced water barrier is suited for subsea cables having different water barrier/sheathing designs.

BACKGROUND

Power cables for intermediate to high current capacities have typically one or more electric conductors at its core followed by electric insulation and shielding of the conductors, an inner sheathing protecting the core, armouring layer, and an outer sheathing. The conductors of power cables are typically made of either aluminium or copper. The conductor may either be a single strand surrounded by electric insulating and shielding layers, or a number of strands arranged into a bunt being surrounded by electric insulating and shielding layers.

These are the typical minimum of components required to make a functional power cable with comparable high electric power transferring capacity. However, a power cable may, also comprise one or more additional components depending on the intended properties and functionalities of the power cable.

Submarine power cables are required to have a water barrier to keep the cable core dry. The water barrier should completely block convection or diffusion of water, as an ingress of moisture can ultimately lead to a failure of the cable. A conventional water barrier is typically manufactured by a continuous or discontinuous extrusion of a seamless metal tube.

Power cables intended to be applied in static conditions, i.e. not being subject to cyclic bending, typically have a water barrier of lead or a lead alloy due to its extrudability and high ductility, while power cables intended to be applied in dynamical conditions, i.e. being subject to cyclic bending, typically have a water barrier of a copper alloy since lead/lead alloys have relatively poor fatigue properties.

It is sometimes necessary to join/splice power cables. The joined area should obtain at least similar mechanical and electrical properties as compared to the rest of the cable to avoid the joint to become a weak link in the power cable. This has proven to be a challenge when joining static cables to dynamic cables.

PRIOR ART

US 2019/0190245 discloses a joint, termination or cross-connection arrangement for a cable. The arrangement includes a first cable and a protective casing. The arrangement further includes a transition sleeve. The transition sleeve is welded to the metallic sheath of the first cable. The transition sleeve is furthermore welded to the protective casing. Thereby, a watertight connection between the metallic sheath of the first cable and the protective casing is achieved without the need for used of lead containing materials. The disclosure further relates to a method of providing such an arrangement.

U.S. Pat. No. 4,427,262 discloses a joint where two cable ends have their cores jointed in a conventional manner. The ends of armour wires, laid up on the cores, are laid with overlap over the core joint. A sleeve with radiused and increased external diameter ends is arranged over the overlap at the core joint. The ends of the armour wires are turned back over the ends of the sleeve such that they come to rest on the outermost surface of the sleeve and are secured thereto by strappings. The outer surface of the sleeve may be coated with an adhesive and gritted to increase the adhesion between the armour wires and the sleeve. The thus spliced armour wires may be provided with a protective winding. The armour splice is such that only a low elongation of the armour wires is possible when longitudinal force is applied to the cable, thus making it particularly suitable for an armoured submarine cable including optical fibres.

OBJECTIVE OF THE INVENTION

The main objective of the invention is to provide a lead based fatigue resistant water barrier over a joint between two power cables which is suitable for joining power cables having welded metal based water barriers.

SUMMARY OF THE INVENTION

The present invention is based on the discovery that when forming a lead-based sealing/water barrier over a joint between two cables where at least one of the power cables has a water barrier made of a welded metal tube of copper/copper alloy or iron/iron alloy, such as typical for dynamical cables, that the adhesion between the lead-based sealing/water barrier and an outer polymeric sheathing which is formed over a transition zone where the lead-based sealing/water barrier is attached to the underlying welded metal tube/water barrier of the power cable is critical to avoid buckling/rupturing of the underlying welded metal tube/water barrier and/or the lead-based sealing/water barrier over the joint. I.e., the sealing between the lead tube of the water barrier over the joint to the underlying metal tube/water barrier of the power cable is the weak spot in the joint.

Thus, in a first aspect, the invention relates to a joined power cable comprising a joint between cable cores of a first and a second power cable sections, wherein
   the first power cable section comprises a first metallic water barrier laid around the cable core of the first power cable section and a first outer sheathing laid around said first water barrier, and
   the second power cable section comprises a second metallic water barrier laid around the cable core of the second power cable section and a second outer sheathing laid around said second water barrier,
wherein the joined power cable comprises
   a tube shaped intermediate water barrier placed radially around and extending across the joint, and having a first end attached to the first water barrier and a second end attached to the second water barrier by attachments, characterised in that
   a reinforcing element is located radially around and attached to a part of the intermediate water barrier adjacent to the attachment at the second end of the intermediate water barrier, the attachment at the second end of the intermediate water barrier and further to a part of the second outer sheathing of the second power cable section, and wherein
the reinforcing element comprises a first layer of a polyethylene based adhesive and a second thermoplastic layer that are thermally set.

In one example embodiment, the joined power cable may, especially if the first water barrier is made of an Al/Al-alloy, a Cu/Cu-alloy, or a Fe/Fe-alloy, further comprise a second reinforcing element laid over the first end of the intermediate water barrier. The second reinforcement is similar to the first reinforcement, i.e. made of a polyethylene based adhesive layer and a thermoplastic layer being thermally set into the reinforcing element.

The term "cable core" as applied herein refers to the electricity carrying part of the power cable which must be protected from intrusion of water/moisture by a water barrier. The invention is not tied to any specific design or construction of the cable core but may be applied on any known cable core known to the skilled person. The cable core typically comprises one or more electric conductors where each conductor consists of either a single strand or a plurality of strands arranged in a bundle. In the case of applying an electric conductor comprising a bunt of strands, the space in-between the strands of electrically conductive material may be occupied by a semiconducting filler compound. Each electric conductor is typically electrically insulated by a dielectric layer and an electric shielded by a semiconducting layer arranged radially around the conductor. The cable core may further comprise optical fibres, umbilical tubes, distancing profiles arranging the electric conductors in a circular cross-section and any other component known to be present in a cable core.

The term "intermediate water barrier" as used herein refers to a tube, preferably made of lead, which is to form a watertight barrier over a joint in the power cable. The intermediate water barrier is arranged to radially extend over and encompass the joint and at least a part of the first and second water barriers of the power cable sections being joined, and have one if it ends watertight attached to the first water barrier of the first power cable section and its other end watertight attached to the second water barrier of the second power cable section. The intermediate water barrier is preferably made of lead or a lead alloy such as e.g. a lead E-alloy.

The term "attachment" as used herein encompasses any manner known to the skilled person of how to attach a tube, such as a leaden tube, to an underlying metallic layer/water barrier such that a watertight attachment/sealing between the underlying metallic layer and the leaden tube preventing intrusion of water into the interior of the leaden tubular intermediate water barrier is obtained. Depending on which metal the underlying water barrier consists of, example embodiments of the attachment includes, but is not limited to, shrinkage rolling, welding, and/or soldering.

The term "water barrier" as used herein refers to a watertight metallic layer usually laid around the cable core to protect the cable core from intrusion of water/moisture. The water barrier of the first and the second water barrier may be similar or dissimilar. For example, one of the first water barrier may be an extruded lead sheath typically applied in static cables or it may be of any other metal known to the skilled person to be suited for forming water barriers in power cables. The first water barrier may also, in example embodiments, be of the same metal as the second water barrier which is a water barrier made of a welded metal sheath typically applied in dynamical cables, e.g. one of an Al/Al-alloy, a Cu/Cu-alloy, or a Fe/Fe-alloy. For example, a copper alloy such as e.g. CuNi, CuNiSi, CuZn, CuSn, or CuAl, or an iron alloy such as e.g. 316 steel.

The term "reinforcing element" as used herein refers to a polymer layer laid onto to mechanically reinforce an end section/transition zone where the intermediate water barrier is attached to the underlying second and/or first water barrier of the second and/or the first power cable section. As given above, the adhesion between the intermediate water barrier and a polymer sheathing above the water barrier is critical to avoid buckling/rupturing of the underlying welded metal tube/water barrier and/or the lead-based sealing/water barrier over the joint. Thus, the reinforcing element is therefore to be applied at least when the intermediate water barrier is attached to an underlying water barrier made of an Al/Al-alloy, a Cu/Cu-alloy, or a Fe/Fe-alloy.

In one example embodiment, the adhesion between the reinforcing element and the end section/transition zone may be enhanced by having the outer surface of the intermediate water barrier, and/or the attachment and/or the exposed part of the second and/or first water barrier cleaned and polished, e.g. with sandpaper and an organic solvent, to remove eventual organic contaminants to obtain a better gluing effect of the polyethylene based adhesive.

In one example embodiment, the adhesion between the reinforcing element and the end section/transition zone may be enhanced by forming a tapered end section of the second outer sheathing of the second power cable section making the outer sheathing gradually thinner in the direction towards the joint. Alternatively, the tapered end section may be formed for both the first and the second outer sheathing.

The first step in the formation of the reinforcing element comprises depositing a layer of polyethylene based adhesive covering at least the end section/transition zone at the end of the intermediate water barrier where the reinforcing element is to be formed. The layer of polyethylene based adhesive should be laid radially around and to at least cover a part of the intermediate water barrier adjacent to the attachment, the attachment, and extend further to cover a part of the outer sheathing of the power cable section. If present, the layer of polyethylene based adhesive is also to be laid radially around the exposed part of the water barrier of the power cable section.

In one example embodiment, the polyethylene based adhesive is a linear low-density polyethylene which is commercially available under the trademark Yparex 9403 supplied by The Compound Company in Netherland. In a further example embodiment, the polyethylene based adhesive is polyethylene based copolymers where the comonomer has a polar functionality such as carboxylic acid, ester, anhydride, epoxy, alcohol, thiol, amine, such as e.g. copolymer of ethylene and ethyl acrylate (or similar acrylates containing >5% ethyl acrylate, copolymer of ethylene and ethyl acrylic acid, methacrylic acid or similar, containing >5% ethyl acrylate, copolymer of ethylene and glycidyl methacrylate (or similar epoxy-based monomer such as 1,2-epoxy-1-butene or similar), containing >5% ethyl acrylate, or copolymer of ethylene and maleic-anhydride (grafted or random block-copolymers) with comonomer content>5%. In one example embodiment, the adhesive may be provided in the form of an adhesive tape which is applied helically over at least the intermediate water barrier to form an adhesive layer of approx. 1.5 mm thickness.

When the adhesive layer is deposited, the next step in the formation of the reinforcing element comprises depositing a layer of a thermoplastic material on top of the adhesive layer. The thermoplastic layer may in one example embodiment be a high density polyethylene applied by extruding it into a tape which is applied helically over the polyethylene based adhesive layer to form an outer sheathing layer of a thickness aligning its outer diameter with the outer diameter of the outer sheathing of the power cable, i.e. make a smooth transition at the interface between the thermoplastic layer and the outer sheathing of the power cable with no or only a relatively small height difference across the interface, which typically gives a thickness of the thermoplastic layer in the range of 1 to 5 mm, or in the range of 2 to 4 mm, or in the range of 3 to 3.5 mm.

BRIEF DESCRIPTION OF THE DRAWINGS

An example of a typical process of splicing power cables and forming the intermediate water barrier and the reinforcing element according to the invention may be schematically illustrated as shown in the figures. The figures are a cut-view drawing as seen from the side.

DETAILED DESCRIPTION

Figure 1A:
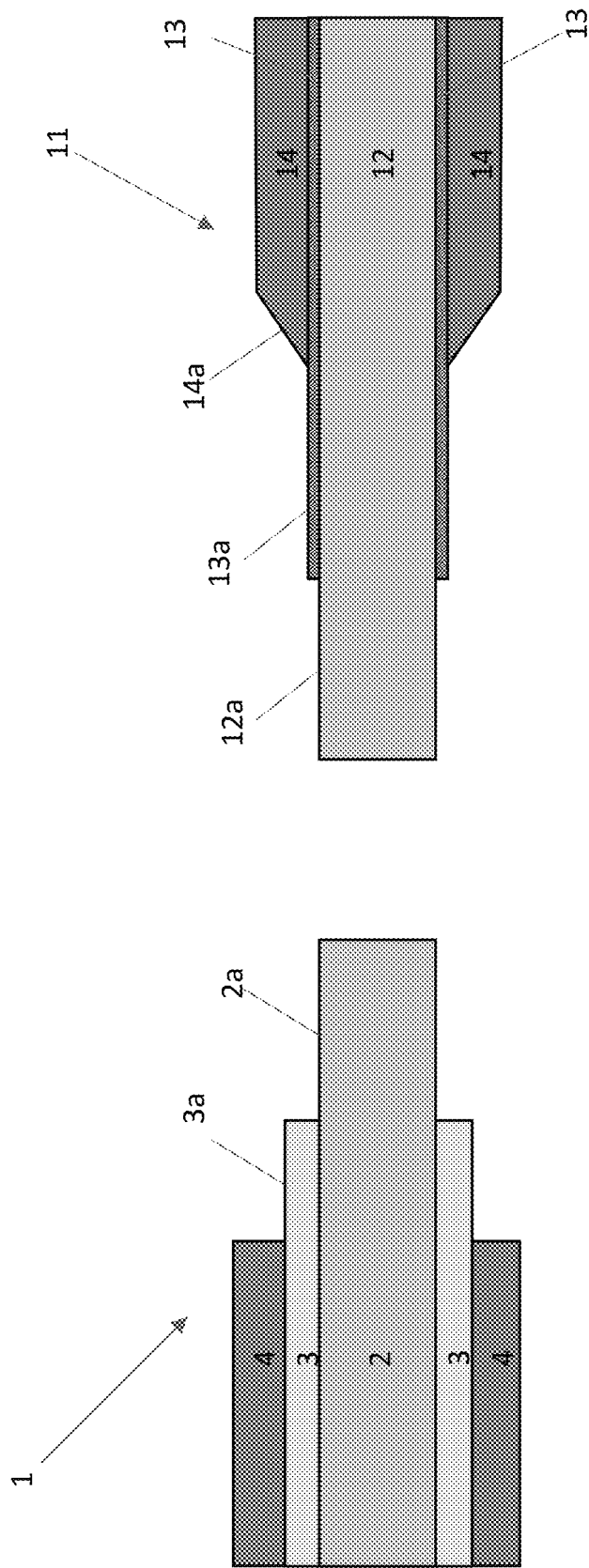
FIG. 1a) is a cut-view drawing as seen from the side illustrating two power cables made ready for being spliced.

FIG. 1a) illustrates a first power cable section 1 made ready for joining its cable core 2 to the cable core 12 of a second power cable section 11 by having a part water barrier 3, 13 removed to expose a part 2a, 12a of the cable cores 2, 12, and a part of their outer polymeric sheathing 4, 14 removed to expose a part 3a, 13a of their water barrier 4, 14. The second power cable 11 is having a water barrier 13 comprising a metal tube of either Al/Al-alloy, Cu/Cu-alloy, or Fe/Fe-alloy such that the outer sheathing 14 is given a tapered end section 14a, while the first power cable 1 has a water barrier 3 made of a lead alloy and is of no need for the reinforcement according to the invention. This end of the intermediate water barrier may be attached and sealed to the water barrier of the power cable in any suitable manner known to the skilled person.

Figure 1B:
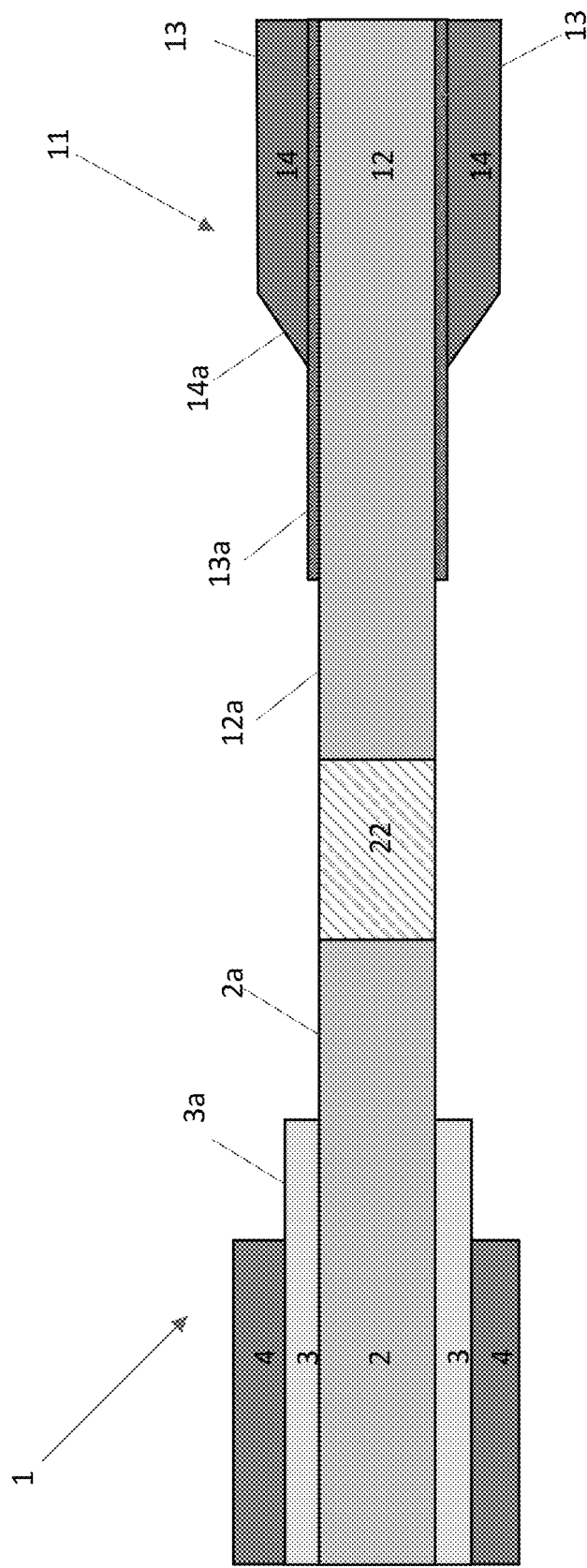
FIG. 1b) is a cut-view drawing as seen from the side illustrating the two power cables shown in FIG. 1a) after splicing together their cable cores (conductor and insulation system) and thus made ready to be applied the reinforced water barrier of the invention.

The next step of a typical splicing process is illustrated in FIG. 1b and includes mechanically and electrically joining the electric conductors) of the cable cores 2, 12 of the first 1 and second 11 power cable. The electric conductors may be joined in any known manner known to the skilled person including, but not limited to, applying a mechanical bolt, forming an additive manufactured bridging element, welding together the conductor strands), etc. When each conductor strand is mechanically and electrically joined, the next step is to electrically insulate and electrically shielding the electric conductor(s) by forming at least a dielectric layer and a semiconducting layer radially around the electric conductors. The splice joining and electrically insulating and electrically shielding the electric conductor(s) of the cable cores is for the cause of simplicity illustrated as a single joint/splicing element 22 in the figures. Up to this stage, the joining process and the resulting joint is conventional and belongs to the prior art.

Figure 2A:
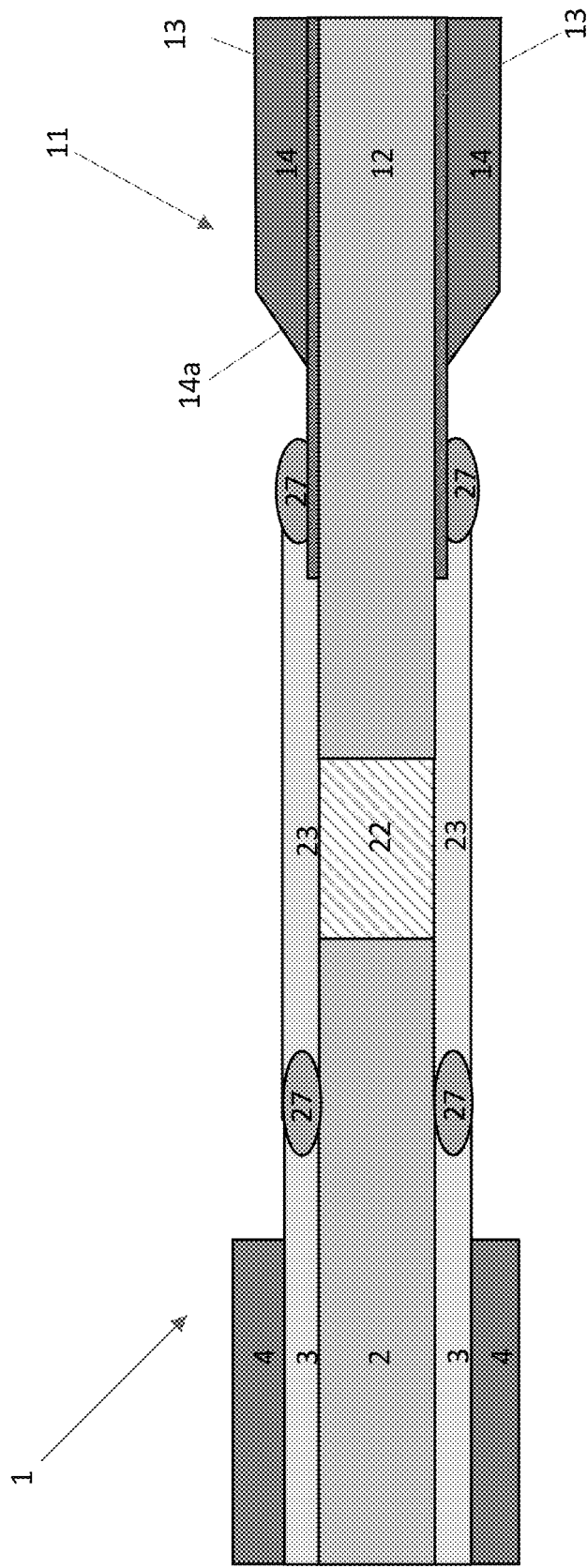
FIG. 2a) is a cut-view drawing as seen from the side illustrating the two power cables shown in FIG. 1b) after instalment of the water barrier according to the invention.
Figure 2B:
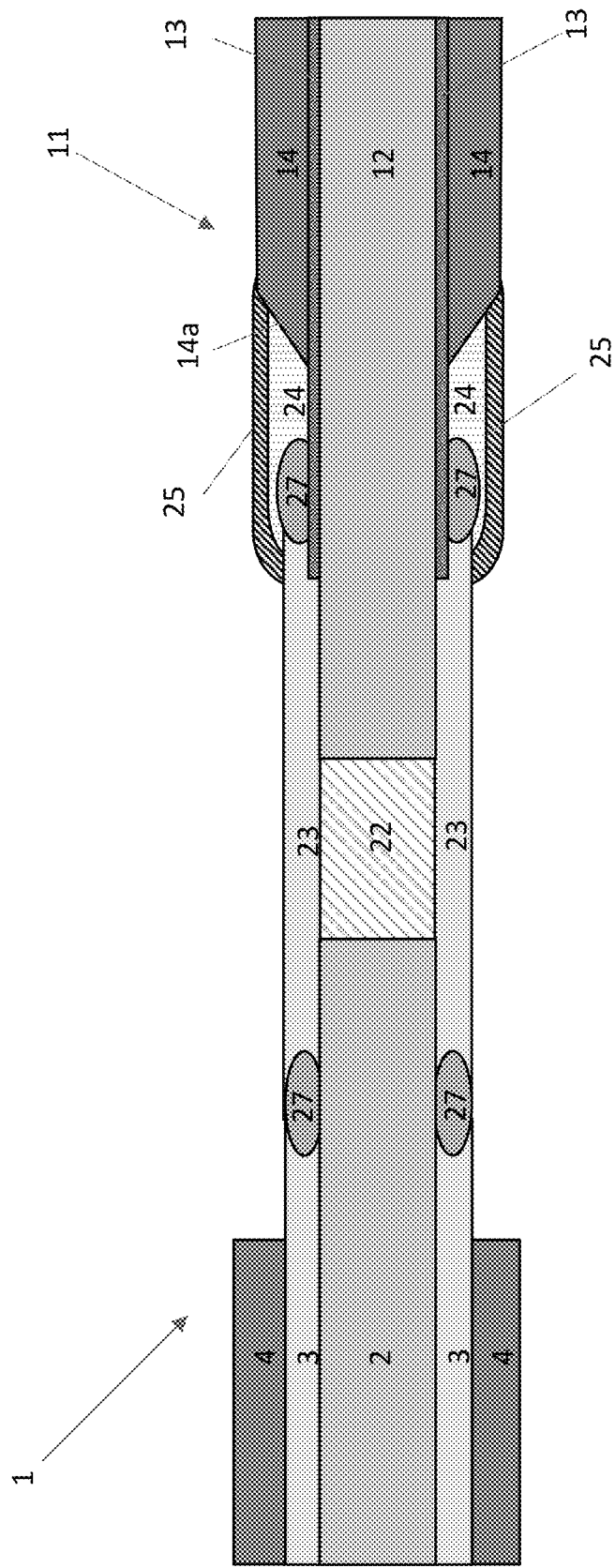
FIG. 2b) is a cut-view drawing as seen from the side illustrating the two power cables shown in FIG. 2a) after instalment of the adhesive layer and the thermoplastic layer to form the reinforcement of the water barrier according to the invention.
Figure 2C:
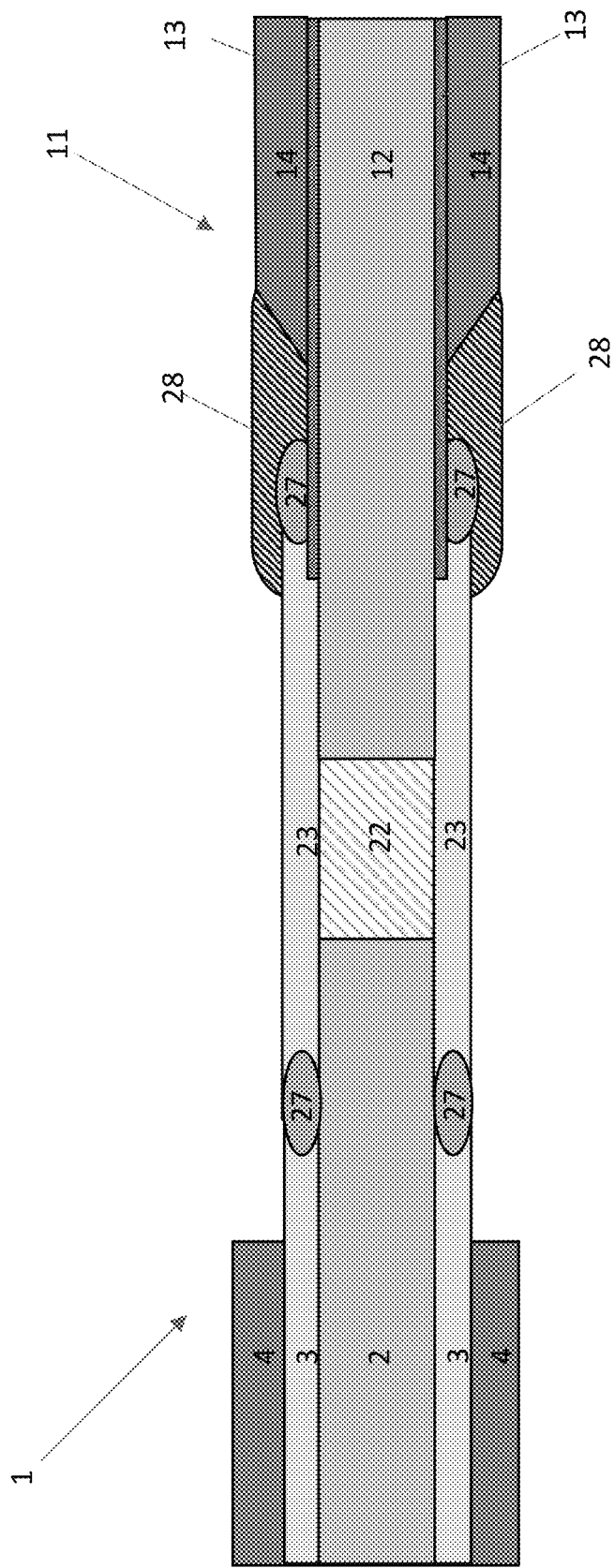
FIG. 2c) is a cut-view drawing as seen from the side illustrating the two power cables shown in FIG. 2b) after thermosetting the adhesive layer and the thermoplastic layer into the reinforcement of the water barrier according to the invention.

When the cable cores are joined by joint 22, the next step is to form a water barrier across the joint. This is obtained according to the invention by depositing an intermediate water barrier 23 made of lead or a lead alloy which partly overlaps with and is attached to the water barriers 3, 13 of the first 1 and the second 11 power cable such as illustrated in FIG. 2a). The intermediate water barrier 23 may e.g. be an extruded tube of lead or a lead alloy which is thread over the metal sheathing/water barrier 3, 13 of one of the power cables 1, 11 to be joined and after the joint is formed is slid back to cross over and bridge the joint, reduction rolled to obtain contact with the underlying first and second water barrier of the first and second power cable and attached by welding, soldering or any other suited method to form a water tight adhesion between the intermediate water barrier 23 and the metal sheathing/water barrier 3, 13 of both power cables 1, 11. In FIG. 2 a) to d), the attachment between the intermediate water barrier 23 and the water barrier 3, 13 of the first 1 and second 11 power cable sections is indicated by welded/soldered regions 27.

FIG. 2 d) illustrates an example embodiment where the second end of the intermediate water barrier 23 is given a first reinforcing element 28 and the first end is given a second reinforcing element 29. FIG. 2 e) illustrates the same example embodiment as in FIG. 2 d), but with an oversheath 26 laid radially around and extending from with a partial overlap with the outer sheathing 4 of the first power cable section 1 to the outer sheathing 14 of the second power cable section 11.

In a second aspect, the invention relates to a method for forming a reinforced intermediate water barrier across a joint between a cable core of a first power cable section and a second cable core of a second power cable section, wherein the first power cable section comprises a first water barrier laid around the cable core of the first power cable section and a first outer sheathing laid around said first water barrier, the second power cable section comprises a second water barrier laid around the cable core of the second power cable section and a second outer sheathing laid around said second water barrier, at least the second water barrier is a made of either an Al/Al-alloy, a Cu/Cu-alloy, or a Fe/Fe-alloy, wherein the method comprises:

exposing an end section of both cable cores of the first and the second power cable sections by removing a part of the water barriers and the outer sheathing, exposing an end section of the water barrier of the first and the second power cable section by removing a further part of the outer sheathing, forming a joint joining the cable core of the first power cable section and the cable core of the second power cable section, forming an intermediate water barrier by:

arranging a tube preferably made of lead or a lead alloy radially around and extending from a first end overlapping a part of the first water barrier, the joint, and to a second end overlapping a part of the second water barrier, and attaching the first end of the tube to the first water barrier by forming an attachment and the second end of the tube to the second water barrier by forming an attachment, characterised in that the method further comprises:

forming a polyethylene based adhesive layer laid radially around and covering at least a part of the intermediate water barrier adjacent to the attachment at the second end of intermediate water barrier, the attachment at the second end of intermediate water barrier, and further to a part of the outer sheathing of the second power cable section, forming a thermoplastic layer laid radially around and covering at least the polyethylene based adhesive layer, and heat treating the polyethylene based adhesive layer and the thermoplastic layer at a temperature thermally setting and melting together the adhesive layer and the thermoplastic layer.

The method according to the second aspect of the invention may in an example embodiment, further comprise forming a tapered end section of the second outer sheathing of the second power cable section making the outer sheathing gradually thinner in the direction towards the joint. The tapered section may be formed to either the first 4, the first and second, or the second outer sheathing.

In a third aspect, the invention relates to an intermediate water barrier over a joint between a cable core of a first power cable and a cable core of a second power cable, where at least one of the first and second cable cores has a water barrier made of a metal tube of either Al/Al-alloy, Cu/Cu-alloy, or Fe/Fe-alloy, characterised in that the intermediate water barrier is made by the method according to the first aspect of the invention.

Figure 2D:
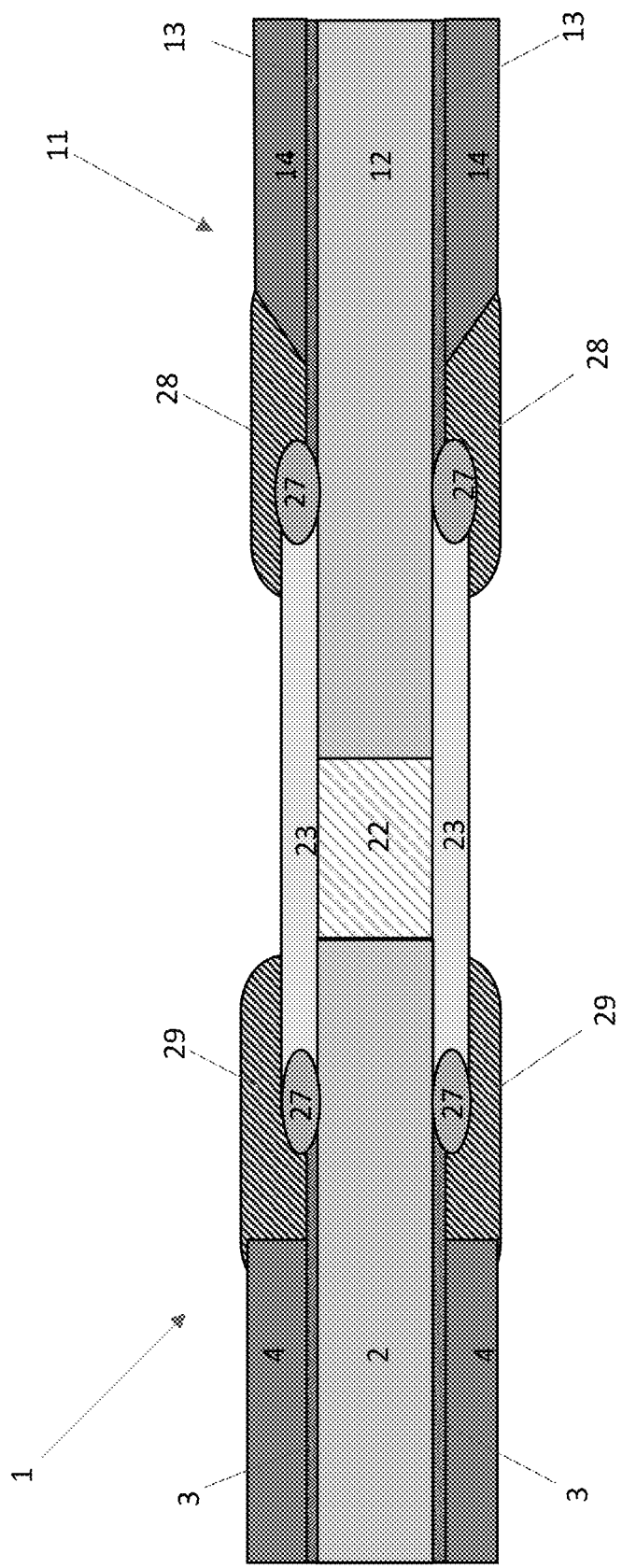
FIG. 2d) is a cut-view drawing as seen from the side illustrating an example embodiment having a reinforcing element of both sides of the intermediate water barrier according to the invention.
Figure 2E:
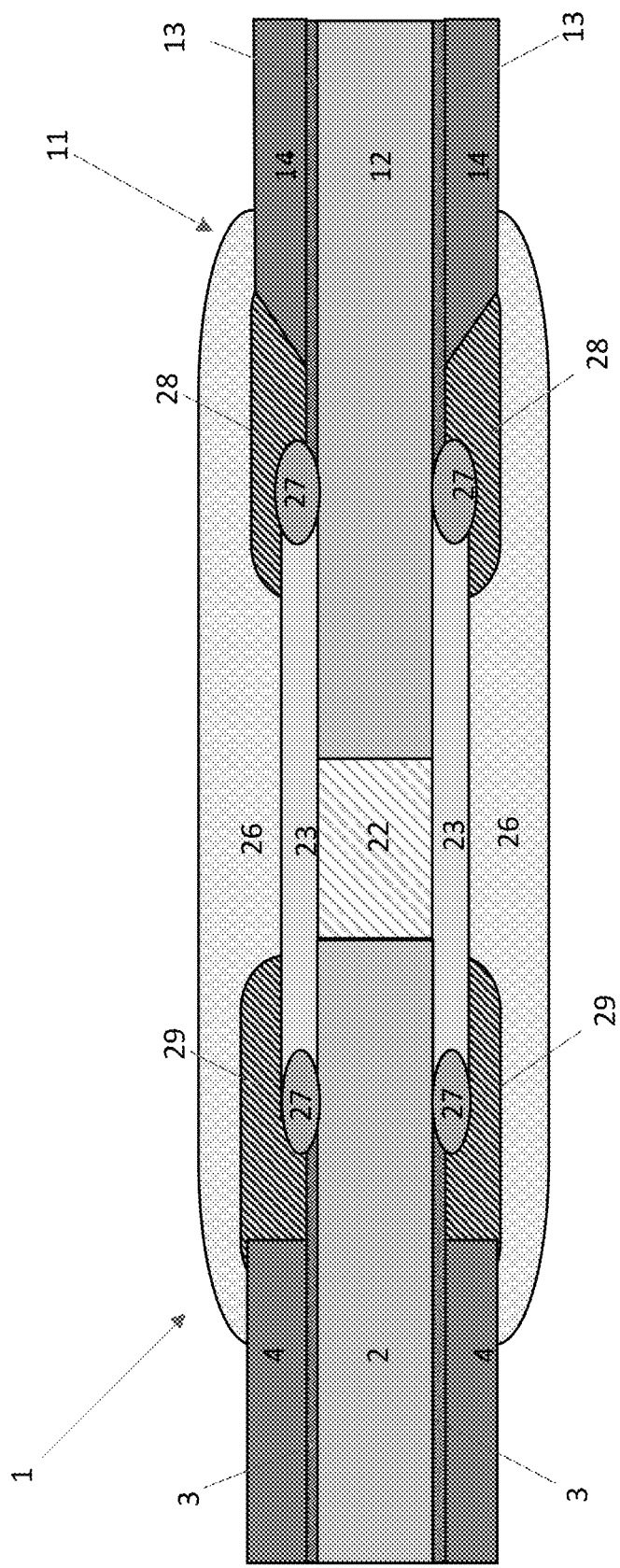
FIG. 2e) is a cut-view drawing as seen from the side illustrating the two power cables shown in FIG. 2d) after instalment of an oversheath over the intermediate water barrier according to the invention.

The invention according to the first, second and third aspect may in one example embodiment further include an oversheath 26 laid radially and enveloping the intermediate water barrier 23, such as shown schematically in FIG. 2d). The invention may apply any oversheath known to the skilled person suited for being used as the outer mantle of power cables, such as e.g. a shrinkage hose made of a thermosetting polymer, a polyethylene polymer such as e.g. chlorosulphanated polyethylene (CSP), etc.

The effect of the invention is verified by comparison tests of bending tolerances of the intermediate water barrier and the transition to original water barriers. In each test, the lead tube was tread over the CuNi-sheathing followed by a shrinkage rolling. Each bending test involved 2×2 bends each way over a 3 m diameter wheel.

Comparison Test 1

A 400 $mm^2$ HVAC power phase of 15 metres and having one section with CuNi-sheathing and one section with Pb-sheathing was applied.

The lead tube was attached, after shrinkage rolling, to the CuNi-sheathing by soldering and with a 40 cm glass fibre reinforcement with a sealing in the middle and attached to the Pb-sheathing as an ordinary joint by double layer of shrinkage hosing over the leaden seal.

The result of the bending test was that the attachment between the CuNi-sheathing and the glass fibre reinforced lead tube failed, the lead tube ruptured, while the attachment between the Pb-sheathing and the lead tube passed. No fissures or ruptures observed.

Comparison Test 2

A 400 $mm^2$ HVAC power phase of 5 metres and having a CuNi-sheathing on both sides, e.g. two transitions between lead and CuNi were made.

The lead tube was attached to the first side by following PS without reinforcement set. 2 shrinkage hoses over sealing. 30 mm overlap with lead over CuNi.

The lead tube was attached to the second side by following PS without reinforcement set. 2 shrinkage hoses over sealing 70 mm overlap with lead over CuNi.

The result of the bending test was that the attachment between the CuNi-sheathing and the lead tube failed on both the first and the second side. The CuNi-sheathing was observed to buckle between the leaden sealing (=solder) and the outer polyethylene polymer sheathing.

Verification Test 1

A 400 $mm^2$ HVAC power phase of 5 metres and having a CuNi-sheathing on both sides of a joint, e.g. two transitions between lead and CuNi were made.

The lead tube overlapped the CuNi-sheathing on both the first and the second side. 10 mm of CuNi was without PE sheath before a slope/transition to PE sheathed CuNi. The adhesive was applied covering the solder 28, the bare CuNi and the slope. PE tape was applied on top, and the adhesive and PE tape was molten with adequate heat to have the materials fused without damaging the power core or CuNi sheath. On the second side a layer of glass fiber reinforcement was used above the bare CuNi.

The result of the bending test was that both transitions between the CuNi-sheathing and the lead tube passed the bending test without signs of buckling or rupture, especially the one without glass fiber.

Verification Test 2

A 400 $mm^2$ HVAC power phase of 5 metres and having a CuNi-sheathing on both sides of a joint, e.g. two transitions between lead and CuNi were made.

The lead tube overlapped the CuNi-sheathing on both the first and the second side. 10 mm of CuNi was without PE sheath before a slope/transition to PE sheathed CuNi. The adhesive was applied covering the solder 28, the bare CuNi and the slope. PE tape was applied on top, and the adhesive and PE tape was molten with adequate heat to have the materials fused without damaging the power core or CuNi sheath.

The result of the bending test was that both transitions between the CuNi-sheathing and the lead tube passed the bending test without signs of buckling or rupture.

Testing finalized and the solution used in production.

Verification by Production and Testing of Power Cables

After a working solution for the transition joint from static to dynamic power phase was obtained the solution has been applied in production of single power phases and used upfront bundling into three phase power cable. The power phase handling and bundling is the real test for the solution, which was simulated with bending test in comparison and verification testing.

Several transition joints have been made, and their integrity have been demonstrated after a range of tests namely:

Bundling/lay-up with repeated bending diameter approximately 3 m.

Tensile bending test of power phase with transition joint according to CIGRE TB490, cl 8.6 with tension 15 kN and 10 m wheel.
Tensile bending test of power cable with transition joint according to CIGRE TB490, cl 8.6 with tension 790 kN and 10 m wheel.
Radial water penetration of transition joint according to CIGRE TB490, cl 8.7.4
Tensioner crush test of power cable with transition joint with 600 kN/m/track.

The invention claimed is:

1. A joined power cable comprising:
a joint between cable cores of a first and a second power cable sections, wherein the first power cable section comprises a first metallic water barrier laid around the cable core of the first power cable section and a first outer sheathing laid around said first water barrier, and
wherein the second power cable section comprises a second metallic water barrier laid around the cable core of the second power cable section and a second outer sheathing laid around said second water barrier,
wherein the joined power cable further comprises
a tube-shaped intermediate water barrier placed radially around and extending across the joint, and having a first end attached to the first water barrier and a second end attached to the second water barrier by attachments, and
a first reinforcement located radially around and attached to a part of the intermediate water barrier adjacent to the attachment at the second end of the intermediate water barrier, the attachment at the second end of the intermediate water barrier, and further to a part of the second outer sheathing of the second power cable section,
and wherein
the first reinforcement comprises first layer of a polyethylene based adhesive and a second thermoplastic layer that are thermally set.

2. The joined power cable according to claim 1, wherein the joined power cable further comprises a second reinforcement located radially around and attached to a part of the intermediate water barrier adjacent to the attachment at the first end of the intermediate water barrier, the attachment at the first end of the intermediate water barrier and further to a part of the first outer sheathing of the first power cable section, and
wherein the second reinforcement comprises a thermally set first layer of a polyethylene based adhesive and a second thermoplastic layer.

3. The joined power cable according to claim 1, wherein the intermediate water barrier is made of lead.

4. The joined power cable according to claim 1, wherein the polyethylene based adhesive layer is a polyethylene-based copolymer where the comonomer has a polar functionality.

5. The joined power cable according to claim 4, wherein the polyethylene based adhesive layer is a polyethylene-based copolymer where the comonomer is any one of carboxylic acid, ester, anhydride, epoxy, alcohol, thiol, or an amine.

6. The joined power cable according to claim 1, wherein the polyethylene based adhesive layer is one of:
a copolymer of ethylene and ethyl acrylate containing >5% ethyl acrylate,—a copolymer of ethylene and ethyl acrylic acid or methacrylic acid containing >5% ethyl acrylate,
a copolymer of ethylene and glycidyl methacrylate or 1,2-epoxy-1-butene containing >5% ethyl acrylate,
or
a grafted or random block-copolymer of ethylene and maleic-anhydride with comonomer content>5%.

7. The joined power cable according to claim 1, wherein the thermoplastic layer is a high-density polyethylene.

8. A method for forming a reinforced intermediate water barrier across a joint between a cable core of a first power cable section and a second cable core of a second power cable section, wherein
the first power cable section has a first water barrier laid around the cable core of the first power cable section and a first outer sheathing laid around said first water barrier,
the second power cable section has a second water barrier laid around the cable core of the second power cable section and a second outer sheathing laid around said second water barrier,
at least the second water barrier is a made of either an Al/Al-alloy, a Cu/Cu-alloy, or a Fe/Fe-alloy,
wherein the method comprises:
exposing an end section of both cable cores of the first and the second power cable sections by removing a part of the water barriers and the outer sheathing,
exposing an end section of the water barrier of the first and the second power cable section by removing a further part of the outer sheathing,
forming a joint joining the cable core of the first power cable section and the cable core of the second power cable section,
forming an intermediate water barrier by:
arranging a tube preferably made of lead or a lead alloy radially around and to be extending from a first end overlapping a part of the first water barrier, the joint, and to a second end overlapping a part of the second water barrier, and
attaching the first end of the tube to the first water barrier by forming an attachment and the second end of the tube to the second water barrier by forming an attachment,
wherein the method further comprises:
forming a polyethylene based adhesive layer laid radially around and covering at least a part of the intermediate water barrier adjacent to the attachment at the second end of intermediate water barrier, the attachment at the second end of intermediate water barrier and further to a part of the outer sheathing of the second power cable section,
forming a thermoplastic layer laid radially around and covering at least the polyethylene based adhesive layer, and
heat treating the polyethylene based adhesive layer and the thermoplastic layer at a temperature thermally setting and melting together the adhesive layer and the thermoplastic layer.

9. The method according to claim 8, wherein the method further comprises forming a tapered end section of the outer sheathing making the outer sheathing gradually thinner in the direction towards the joint.

10. The method according to claim 8, wherein the polyethylene based adhesive layer is selected from the group consisting of:
a polyethylene-based copolymer where the comonomer has a polar functionality such as carboxylic acid, ester, anhydride, epoxy, alcohol, thiol, or an amine;

a copolymer of ethylene and ethyl acrylate containing >5% ethyl acrylate;

a copolymer of ethylene and ethyl acrylic acid or methacrylic acid containing >5% ethyl acrylate;

a copolymer of ethylene and glycidyl methacrylate or 1,2-epoxy-1-butene containing >5% ethyl acrylate; and a grafted or random block-copolymer of ethylene and maleic-anhydride with comonomer content>5%.

11. The method according to claim 10, wherein the polyethylene based adhesive layer is deposited by forming the polyethylene-based adhesive into an adhesive tape and wounding it helically around the bonding zone into a layer of 1.5 mm thickness.

12. The method according to claim 8, wherein the thermoplastic layer is a high-density polyethylene.

13. The method according to claim 12, wherein the thermoplastic layer is deposited by shaping a high-density polyethylene into a tape and wounding it helically around the adhesive layer into a layer of thickness in the range of from 1 to 5 mm.

14. An intermediate water barrier over a joint between a cable core of a first power cable and a cable core of a second power cable, where at least one of the first and second cable cores has a water barrier made of a metal tube of either Al/Al-alloy, Cu/Cu-alloy, or Fe/Fe-alloy, wherein the intermediate water barrier is made by the method according to claim 8.

\* \* \* \* \*